(12) United States Patent
Vleugels (10) Patent No.: US 8,953,920 B2
(45) Date of Patent: Feb. 10, 2015

(54) SEMI-AUTOMATED OPTICAL FIBER DISTRIBUTION SYSTEM

(75) Inventor: Ludwig Vleugels, Zichem (BE)

(73) Assignee: Giga-Com Benelux BVBA, Zichem (BE)

( * ) Notice: Subject to any disclaimer, the term of this patent is extended or adjusted under 35 U.S.C. 154(b) by 0 days.

(21) Appl. No.: 13/702,146

(22) PCT Filed: May 20, 2011

(86) PCT No.: PCT/EP2011/058245
§ 371 (c)(1),
(2), (4) Date: Jan. 23, 2013

(87) PCT Pub. No.: WO2011/160906
PCT Pub. Date: Dec. 29, 2011

(65) Prior Publication Data
US 2013/0209048 A1    Aug. 15, 2013

Related U.S. Application Data

(60) Provisional application No. 61/358,011, filed on Jun. 24, 2010.

(51) Int. Cl.
*G02B 6/00* (2006.01)
*G02B 6/44* (2006.01)
*G02B 6/35* (2006.01)
*B23P 6/00* (2006.01)

(52) U.S. Cl.
CPC ............ *G02B 6/4452* (2013.01); *G02B 6/3502* (2013.01); *B23P 6/00* (2013.01); *G02B 6/3574* (2013.01)
USPC ............................................. 385/135; 385/17

(58) Field of Classification Search
USPC .......................................................... 385/135
See application file for complete search history.

(56) References Cited

U.S. PATENT DOCUMENTS 5,784,515 A * 7/1998 Tamaru et al. ................ 385/134
6,973,251 B2 * 12/2005 Morellec et al. .............. 385/135
7,068,906 B2 * 6/2006 Bianchi et al. ................ 385/134

(Continued)

FOREIGN PATENT DOCUMENTS

WO         02/097504 A1     12/2002
WO    WO 02097504 A1 *    12/2002    ............... G02B 6/44

OTHER PUBLICATIONS

International Search Report and Written Opinion issued Sep. 9, 2011 in PCT/EP2011/058245.

*Primary Examiner* — Kaveh Kianni
(74) *Attorney, Agent, or Firm* — Jeffrey S. Melcher; Manelli Selter PLLC (57) ABSTRACT

The present invention relates to a method for reconfiguration of an optical fiber distribution system (100). The system (100) comprises a patch panel (101). The patch panel (101) comprises subsets of adapters (103). Each adapter (103) is configured to receive an optical connector and provide optical connection to the connector when patched in the adapter (103). The patch panel (101) further comprises subsets of parking adapters (111). Each parking adapter (111) is configured to park an optical connector. The system (100) further comprises a first connectorized fiber cable (105) terminated in a first end with a first optical connector. The first optical connector is connected to a first adapter (103). The first optical connector is moved from the first adapter (103) to a first parking adapter (111). Each subset of parking adapters (111) is positioned in a predetermined distance from the subset of adapters (103).

19 Claims, 8 Drawing Sheets

(56) References Cited

U.S. PATENT DOCUMENTS

| | | | |
|---|---|---|---|
| 7,292,764 B2* | 11/2007 | Morellec et al. | 385/135 |
| 8,068,715 B2* | 11/2011 | Kewitsch | 385/147 |
| 2004/0136677 A1* | 7/2004 | Morellec et al. | 385/135 |
| 2005/0276543 A1* | 12/2005 | Bianchi et al. | 385/53 |
| 2006/0182406 A1* | 8/2006 | Morellec et al. | 385/135 |
| 2009/0324179 A1* | 12/2009 | Xia et al. | 385/99 |
| 2010/0316334 A1* | 12/2010 | Kewitsch | 385/78 |
| 2012/0321255 A1* | 12/2012 | Kewitsch | 385/78 |

* cited by examiner

SEMI-AUTOMATED OPTICAL FIBER DISTRIBUTION SYSTEM

TECHNICAL FIELD

This invention relates generally to an optical fiber distribution system. More particularly this invention relates to an optical fiber distribution system for coupling of connectorized fiber cables.

BACKGROUND

Fiber is playing a more and more dominant role in telecom networks. Up till now, the use of fiber has been mainly limited to long-haul and metro networks. Recently, more and more operators have started to use fiber in the access. Fiber-To-The-Home (FTTH), Fiber-To-The-Building (FTTB), advanced Hybrid Fiber-Coax (HFC) and Digital Subscriber Line (DSL) networks all require fiber on a large scale.

The management of the physical layer, i.e. the fiber itself, has not seen a lot of innovation in the last decade. Manual Optical Distribution Frames (ODFs) usually terminate the fibers, coming from the outside plant, inside the Central Office (CO) on an optical connector. A Central Office is a building that houses all the transmission equipment of an operator. This optical connector provides the flexibility required for reconfiguration, further upgrades, redundancy or test access. Typical ODFs are frames of 2 m high and 1 m wide, terminating 500+ fibers.

Furthermore, fiber-rich architectures, like fiber-to-the-home, will require a flexibility point outside the CO as well. Typically, street cabinets are used to collect the fibers from the neighborhood and transport the information to the central office.

Reconfiguration of the physical fibers is often necessary. Some example occasions are listed below:
  During network build or commissioning.
  When a customer wants a connection.
  When the network needs to be tested for pro-active monitoring.
  When the network needs to be tested for troubleshooting.
  When a customer wants to stop the service.
  When a customer wants move to another operator in open access networks (churn).
  When a customer wants another service, i.e. grooming, load balancing.
  During network upgrades.
  Etc.

Every time an activity like the ones listed above, is required, a truck roll and a manual intervention will be necessary. These interventions are expensive, require 24/7 availability of skilled technicians and the risk of making errors is substantial. In some cases, the ODF or street cabinet, such as a Fiber Distribution Hub (FDH) becomes a big issue in the network if the fibers are not managed in the correct way. Furthermore, the information database comprising information of the network is not always in line with the reality, because every change in the network needs to be reported to the database system manually. Most of the fiber optic patch panels that are currently available on the market are bulky due to big dimensions of the connectors, the big cable diameters and cable bend radius restrictions.

Therefore, automated fiber management has been discussed. Most of the full optical switches available on the market today, are high-end products that are too expensive for use in access networks. Their feature set, i.e. switching time/optical losses etc, is somewhat different from what will be required in access networks. The most popular technology for optical switches is three dimensional (3D) Micro Electro-Mechanical Systems (MEMS) technology, where micro-mirrors are used to reflect the light beam. Changing the position of these mirrors may reflect the light in another direction. However, such fully automated cabinets have some disadvantages such as a very high initial cost, weak optical performance and the cabinet itself is bulky and not scalable. Further, fully automated ODFs used in access networks do not provide a "latching" feature, which means that they need both power and a backup power source. There is also reliability issues associated with the fully automated ODFs, when such a high end product becomes a single point of failure.

Up till now, there are no operators deploying fully automated switches in the access network on a large scale because of the issues mentioned above.

SUMMARY

The objective is therefore to obviate at least some of the above disadvantages and to provide an improved optical fiber distribution system.

According to a first aspect of the invention, the objective problem is solved by a method for reconfiguration of an optical fiber distribution system. The optical fiber distribution system comprises at least one patch panel. The at least one patch panel comprises a plurality of subsets of adapters. Each adapter is configured to receive an optical connector and to provide optical connection to the respective optical connector when patched in the respective adapter. The patch panel further comprises a plurality of subsets of parking adapters. Each parking adapter is configured to park an optical connector. The system further comprises at least a first connectorized fiber cable terminated in a first end with a first optical connector. The first optical connector is connected to a first adapter. The first optical connector is moved from the first adapter to a first parking adapter in a first subset of the plurality of subset of parking adapters. Each respective subset of parking adapters is positioned in a predetermined distance from the respective subset of adapters.

According to a second aspect of the invention, the objective problem is solved by an optical fiber distribution system for coupling of connectorized fiber cables. The optical fiber distribution system comprises at least one patch panel comprising a plurality of subsets of adapters. Each adapter is configured to receive an optical connector and to provide optical connection to the respective optical connector when patched in the respective adapter. The system further comprises at least one connectorized fiber cable terminated in a first end with a first optical connector. The patch panel further comprises a plurality of subsets of parking adapters. Each parking adapter is configured to park a respective optical connector. Each of the respective subsets of parking adapters corresponds to a respective subset of adapters, and each respective subsets of parking adapters is positioned in a predetermined distance from the respective subset of adapters.

Thanks to the close location of the parking adapters, which are in a predetermined distance from the adapters, there are no fiber management problems or entanglement issues. Thus, an improved optical fiber distribution system is provided.

The technology according to the present invention offers many advantages, for which a non-exhaustive list of examples follows:

Using a semi-automated optical fiber distribution system provides the possibility to manage the fibers, i.e. the optical fiber cables, in both a manual and automated fashion. The present optical fiber distribution system has the same good optical performance and reliability as a traditional manual system, e.g. no signal loss in case of a system failure. The optical fiber distribution system allows for reconfigurations and test access without a manual intervention or truck roll, which is a cost effective and environmentally friendly advantage. The optical fiber distribution system is scalable and dense, and may be used in both indoor and outdoor plant operations. Another advantage of the present solution is the possibility to upgrade the system from manual to automated, and even the possibilities to temporary automate a manual system. The semi-automated optical fiber distribution system does not provide any fiber management problems regarding entangling of cables when the system is operated by a robot, due to a close parking position. A further advantage is that it provides the possibility to reconnect cables and that provides non-entangling in an automated way.

The present invention is not limited to the features and advantages mentioned above. A person skilled in the art will recognize additional features and advantages upon reading the following detailed description.

BRIEF DESCRIPTION OF THE DRAWINGS

The invention will now be further described in more detail by reference to the appended drawings illustrating embodiments of the invention and in which.

The drawings are not necessarily to scale, emphasize is instead being placed upon illustrating the principle of the invention.

DETAILED DESCRIPTION

The basic concept of the present solution is to provide a semi-automated optical fiber distribution system that allows changing the physical infrastructure of a fiber optic network without manual interventions.

The semi-automated optical fiber distribution system may be part of an optical distribution frame (ODF) which may be adapted for indoor or outdoor mounting, or part of a Fiber Distribution Hub (FDH) which may be a street cabinet or even mounted indoors.

The optical fiber distribution system may be used in various applications, such as for example a fiber-to-the-home cabinet or an ODF in a central office environment. The example of a fiber-to-the-home (FTTH) cabinet will be used in the following description for illustration purposes only. Fiber-to-the-home is a broadband access architecture where a fiber is terminated directly inside a residential premise. A person skilled in the art will understand, from the description below, how to implement the present solution in other types of applications.

Figure 1A:
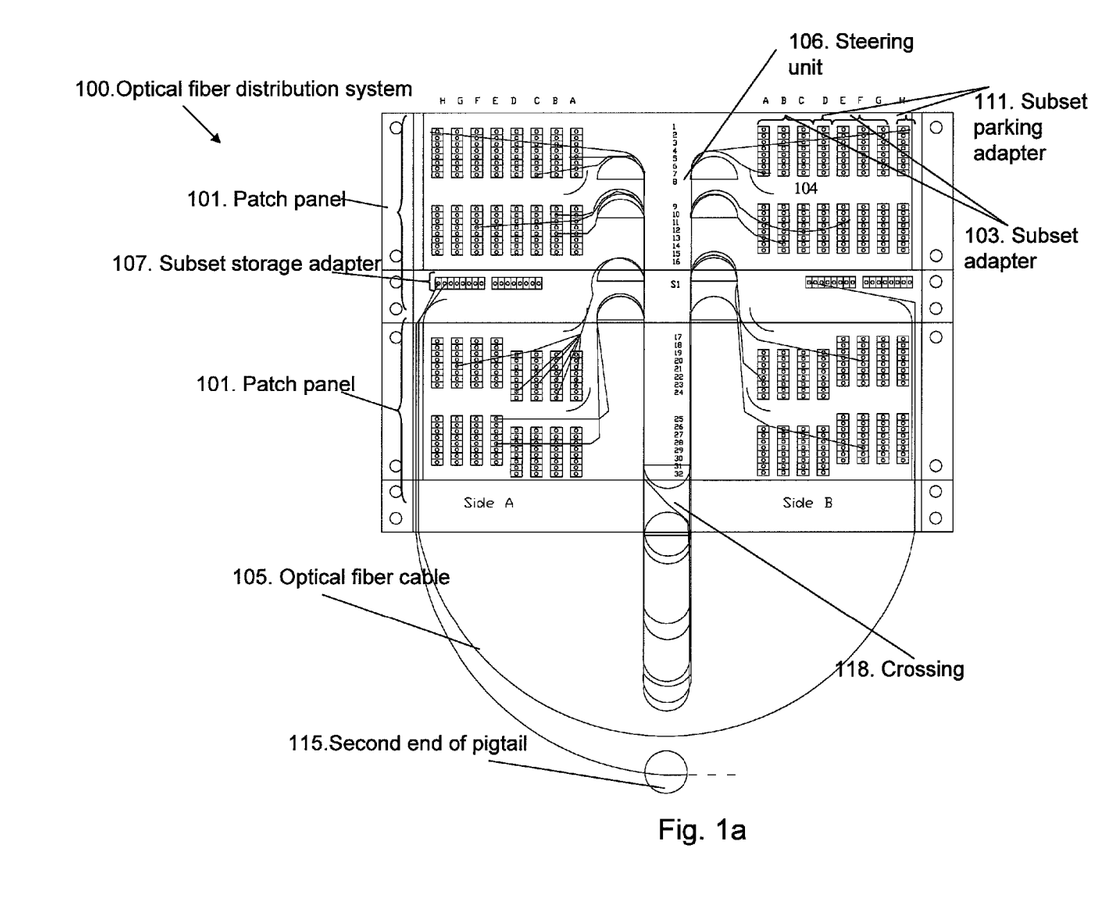
FIG. 1a is a diagram illustrating an embodiment of a semi-automated optical fiber distribution system with a vertical layout.

FIG. 1a illustrates an example of a fiber-to-the-home cabinet where the optical fiber distribution system 100 according to the present solution is used. In a FTTH setup, a cabinet is placed between the central office and the customers. In FIG. 1a, the optical fiber distribution system 100 is illustrated as having two of fiber optic patch panels 101. However, the optical fiber distribution system 100 may have more than two patch panels 101. In this example, the patch panel 101 is divided in two sides, side A and side B. Side A represents fibers coming from the central office and side B represents fibers going to the customers, i.e. the homes. The patch panel 101 may be arranged as a matrix, having rows and columns.

In open access architectures, the optical fiber distribution system 100 may be used by one or more operators providing optical fiber services to homes. For example 33% of side A may come from operator x, 33% may come from operator y and 33% may come from operator z etc.

Figure 1B:
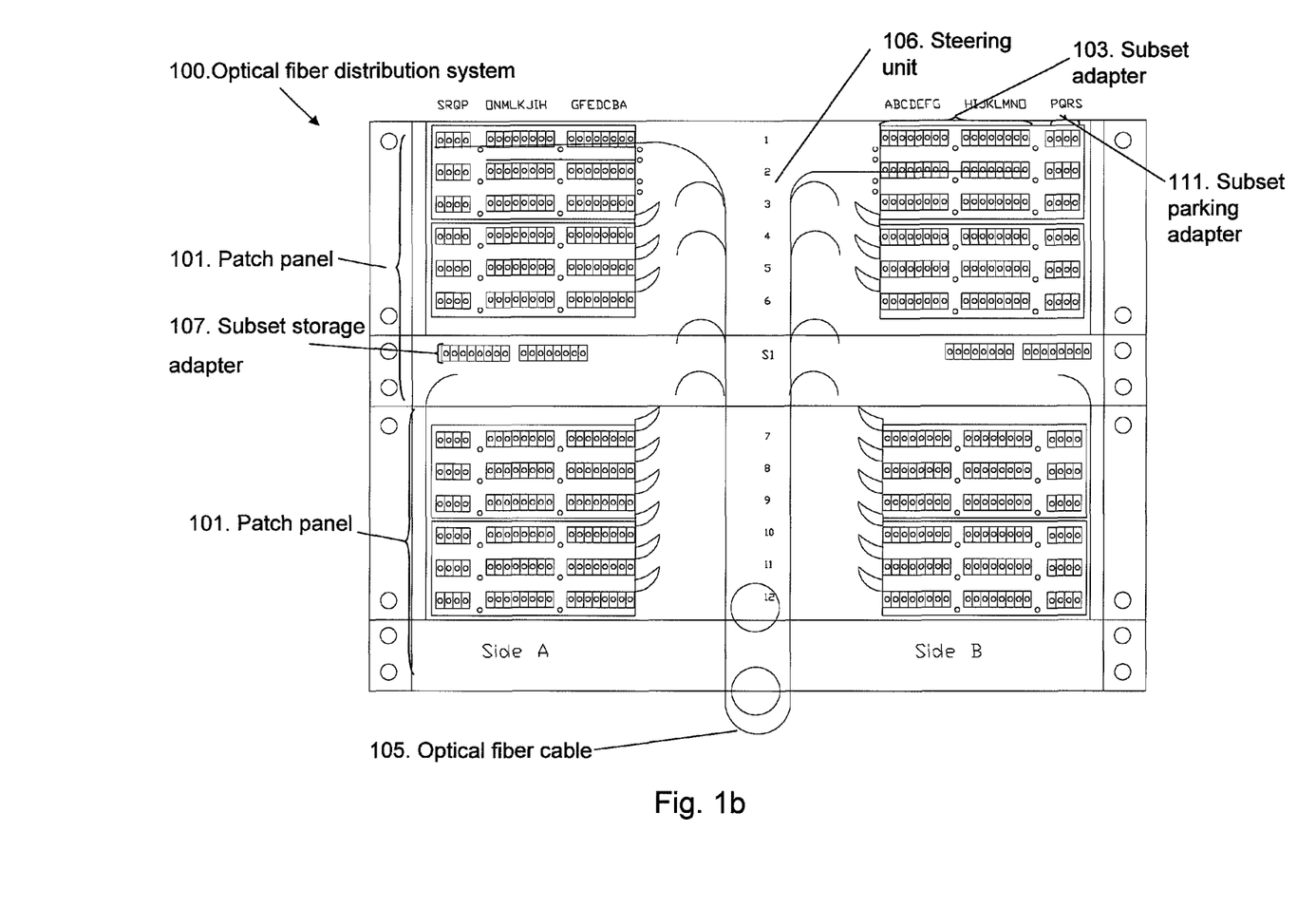
FIG. 1b is a diagram illustrating an embodiment of a semi-automated optical fiber distribution system with a horizontal layout.

The patch panel 101 comprises a plurality of adapters 103 grouped in subsets in a vertical layout. FIG. 1b illustrates the optical fiber distribution system 100 where the adapters 103 are positioned in a horizontal manner. The reference numbers in FIG. 1b refer to the same elements of the system 100 as in FIG. 1a. Therefore, the description of the elements is not repeated with reference to FIG. 1b. As mentioned above, the patch panel 101 may be arranged as a matrix. A subset of adapters 103 may be designed as a sub matrix of adapters 103 comprising e.g. three columns, i.e. vertical, of adapters, such as e.g. column A, B and C in FIG. 1a. Each column may comprise 8 rows of adapters 103, e.g. rows 1-8 in FIG. 1a. Thus, the example sub matrix, i.e. a subset, of adapters comprises 3×8=24 adapters 103. Between each column of adapters 103 there is an open space. The open space provides space for a robot arm to be able to pick and place an optical connector 104 out of and into an adapter 103. The size and form of the open space is connected to the design of the robot. An adapter 103 is used when two optical connectors 104 have to be mated. The adapter 103 is positioned between two optical connectors 104 and takes care of the alignment of these optical connectors 104, and ensures the physical contact between the two optical connector tips, i.e. ferrules. A sleeve is mounted inside the adapter takes care of the alignments of the ferrules. An adapter 103 on the patch panel 101 may be in one of the following states:

Connected to (side, row, column) e.g. A04F in FIG. 1a
Empty
In test

In FIG. 1b, the subset of adapters 103 are illustrated as a sub matrix of adapters 103 comprising e.g. rows of adapters arranged in a horizontal way, such as e.g. adapters A-O. The explanation above is equivalent for the horizontal layout illustrated in FIG. 1b.

Optical fiber cables coming from e.g. the central office are terminated, at the back side (not shown), of the adapters 103 on the left side, i.e. side A, by patching an optical connector (not shown) from the incoming central office cable to the back side of the adapter 103. The fiber cables going to the customers, i.e. the homes, are terminated, at the back side, of the adapters 103 at the right side, i.e. side B, by patching an optical connector from the outgoing customer cable to the back side of the adapter 103.

The adapters 103 may be covered by a removable dust cap (not shown) when not in use. This dust cap protects the optical connector patched at the back side of the adapter 103 from dust that may cause problems for the light passing through the optical fiber cable. The dust cap may be removed manually or automatically.

Connectorized fiber cables 105 may be connected at the front side of a patch panel 101 for flexibility. A connectorized fiber cable 105 is used to make a cross-connection between two adapters 103 inside the optical fiber distribution system 100. A connectorized fiber cable 105 is used to make a connection from e.g. the left side A, i.e. the CO side, to the right side B, i.e. the customers of the patch panel 101. In the optical fiber distribution system 100 it is possible to connect a connectorized fiber cable between any of the adapters 103 on the patch panel 101, i.e. to make an any-to-any connection, because there are no dedicated inputs or dedicated outputs.

The connectorized fiber cable 105 may be for example a patch cord or a pigtail. A patch cord is, as known for a person skilled in the art, an optical fiber cable terminated at each end with an optical connector 104. The optical connectors 104 may be patched to e.g. an adapter 103 on the patch panel 101.

A pigtail is an optical fiber cable terminated at a first end with an optical connector and where the second end is directly spliced to for example another cable or a splitter module. The optical connector may be patched to an adapter 103 on the patch panel 101.

The connectorized fiber cables 105 are ultra-thin cables with a diameter of for example 1 mm and length of e.g. 110 cm. All connectorized fiber cables 105 in the optical fiber distribution system 100 may have the same diameter and length. The small size of the ultra-thin connectorized fiber cables 105 is necessary to avoid tangling of the connectorized fiber cables 105 when routed over a steering unit 106. The steering unit 106 may also be called drum or steering drum. Despite the small diameter of the connectorized fiber cables 105, the performance and loss of the optical fiber cables are good. The connectorized fiber cables 105, when routed over the steering unit 106, may have a minimum bending radius that is in line with the cable and fiber specification at all times. The connectorized fiber cables 105 may be routed over the steering unit 106 in a non-entangling path, which eliminates fiber management problems.

The optical connectors of the connectorized fiber cables 105, when patched, in one end, to a first adapter 103 and, in a second end, to a second adapter 103 may be routed over the steering unit 106. The steering unit 106 may have a substantially circular or half circular shape, and may be positioned in the center of the patch panel 101, for example between side A and side B as illustrated in FIG. 1a. The steering unit 106 may have a radius sufficiently large to avoid breakage and too much loss in a connectorized fiber cable 105 when guided or routed around the steering unit 106.

There may be no overlength of the connectorized fiber cables 105, due to the steering unit 106 that compensates for the overlength. The steering unit 106 may ensure that no sharp bends on the connectorized fiber cables 105 are made, that may result in optical losses.

In the beginning, a certain amount of connectorized fiber cables 105 may be temporary stored at their storage positions in storage adapters 107. When a customer wants service, the connectorized fiber cable 105 will make the connection from the left side A to the right side B. The connectorized fiber cable 105 is moved by a robotic unit (not shown) that is positioned in front of the patch panel 101. The robotic unit will be described in more detail later. This sequence will repeat itself until all stored connectorized fiber cables 105 will be used. At that time, a service technician will pass by to manually add further connectorized fiber cables 105 to the system 100, i.e. to reconfigure the system 100. When the optical fiber distribution system 100 is used in open access networks by more than one operator, each operator may have its own respective storage adapters 107. In FIG. 1a, the patch panel 101 is exemplified as having storage adapters 107 on both side A and side B of the steering unit 106. To avoid entangling of the connectorized fiber cables 105, the subsets of adapters 103 positioned on side A may use the storage adapters 107 on side A, and the subset of adapters 103 positioned on side B may use the storage adapters 107 on side B of the patch panel 101. The storage adapters 107 is exemplified in FIG. 1a as being in a horizontal row, however other configurations of the storage adapters 107 are also possible, such as e.g. a vertical column.

When a re-configuration of the optical fiber distribution system 100 is required, the affected optical connector in use, patched in an adapter 103 may be moved to an adjacent parking adapter 111 by the robotic unit. After this operation, the adapter 103 is free and available to accept a new optical connector coming from the storage adapter 107. The patch panel 101 comprises a plurality of parking adapters 111 grouped in subsets for temporary parking of the optical connectors. FIG. 1a shows, as an example a subset of parking adapters 111 as columns, e.g. column D and column H, comprising 8 parking adapters 1-8. However, the number of adapters 103 in the subset may be different from what is exemplified in FIG. 1a. The number of adapters 103 at a certain parking area may be also changed, and may be different for different operators. FIG. 1a shows 24 adapters 103 for each 8 parking adapters 111, but any other number and configuration may also be possible. FIG. 1b illustrates an embodiments where the parking adapters 111 are arranged in a horizontal manner, i.e. in rows instead of columns as in FIG. 1a. In the embodiment in FIG. 1b, the letters P-S are a subset of parking adapters.

Each respective subset of parking adapters 111 are positioned on the patch panel 101 so that they provide short traveling distance for the optical connector when moved from an adapter 103 in a subset of adapters 103 to a respective parking adapter 111 in a subset of parking adapters 111. In other words, the parking adapters 111 are close to or in the proximity of the respective subset of adapters 103. The short traveling distance for the optical connector, i.e. patch cord connector or pigtail connector, is achieved when each respective subsets of parking adapters 111 is positioned in a predetermined distance from the respective subset of adapters 103. This distance may correspond to maximum a constant times the diameter of a connectorized fiber cable 105:

$$\text{Distance} = \max(k \cdot \text{diameter})$$

As mentioned earlier, the connectorized fiber cables 105 may have a diameter of for example 1 mm. The constant may be equal to for example 100. Using these example numbers, the distance between the parking adapters 111 and the adapters 103 may be maximum 100×1 mm=100 mm. The constant may preferably be in the range of 50-150, more preferably in the range of 75-125, and most preferably in the range of 90-110, and the diameter may preferably be in the range of 0.2 mm-10 mm, more preferably in the range 0.5 mm-5 mm and most preferably in the range of 0.8 mm-1.2 mm. If the distance between the parking adapters 111 and the adapters 103 is too large, fiber management problems arise and the connectorized fiber cables 105 will entangle. A subset comprising 24 adapters 103 may have a respective subset comprising for example 8 parking adapters 111. FIG. 1a illustrates one column of parking adapters 111 as an example, e.g. column D on side B, belonging to the subset of adapters 103 comprising the adapters 103 on columns A, B and C. However, a person skilled in the art will understand that the number of adapters in the subset of adapters 103 may be different than exemplified in FIG. 1*a*.

Thus, the optical fiber distribution system 100 comprises two types of adapters for connectorized fiber cables 105 not being in use. The first type is the storage adapter 107 which is for "unused" optical fiber cables 105, i.e. before an optical connector of a connectorized fiber cable 105 is patched to an adapter 103. The other type is the parking adapter 111 which is for "used" optical fiber cables 105, i.e. after an optical connector of a connectorized fiber cable 105 has been patched to an adapter 103. Neither the storage adapters 107 nor the parking adapters 111 provide optical connection for the connectorized fiber cable 105.

As mentioned above, the optical fiber distribution system 100 comprises a robotic unit (not shown) configured to manipulate the connectorized fiber cables 105. The robotic unit may be designed as a robotic arm or a device that moves in a xy patch in a frame having at least one gripper to pick and place the optical connectors of the connectorized fiber cables 105 in adapters without creating optical losses on other connectorized fiber cables 105 or create entanglement of the connectorized fiber cables 105. The robotic unit is also configured to guide and route the connectorized fiber cables 105 over the steering unit 106. The robotic unit may be placed in front of the patch panel 101 when it is in operation. When the robot is in idle state, it may be positioned in the corner of the optical fiber distribution system 100, or in a position where the robotic unit is not a hindrance for a service technician that needs to perform manual service or maintenance of the optical fiber distribution system 100. Since the robotic unit is placed in the fiber distribution system 100, there are of course restrictions on the physical dimension of the robotic unit.

The optical fiber distribution system 100 may initially be installed without the robotic unit, i.e. it is a manual system initially. However, the manual system may at any time be upgraded and automated by installing the robotic unit. This may be done without disturbing or interrupting the already existing optical connections. In some embodiments, the system 100 may be temporary automated for example until all the patching of connectorized fiber cables 105 is completed. This way, the system 100 allows both manual and automatic manipulations.

The robotic unit may be controlled or operated from a computer in a "remote" location. The remote location may be for example the central office, as described above, or the Network Operations Center (NOC) of the operator. An Element Management System (EMS) will control and manage all the hardware of the entire network of an operator. The EMS may perform the following functions:

Authentication, Authorization and Accountability (AAA), e.g. user groups, passwords.
System Navigation, e.g. using Geographic Information System (GIS) tools.
Alarm & Fault management
Configuration management, e.g. Network Inventory, Discovery, Synchronization, Firmware.
Provisioning and Re-Configuration
Test Access Management, e.g. Test scheduling and results data gathering.
External interfaces, e.g. northbound Operations Support System (OSS) Integration, alarm forwarding, etc. . . .
Customer specific requirements.

The robotic unit may receive instructions from this EMS, instructions to for example move the optical connector from a storage adapter 107 to an adapter 103. Further, the EMS may comprise a database storing information about for example the status, e.g. connected, empty, in test, of the adapters 103 of the optical fiber distribution system 100. The database may be automatically updated when the robotic unit performs an operation in the optical fiber distribution system 100, or when the system 100 is manually configured, for example when connectorized fiber cables 105 are added to the storage adapters 107, when "cleaning up" parked connectorized optical fiber cables 105 and when the system 100 is manually modified. The database and instructions may be stored in a computer readable medium.

During the maintenance, a service technician may manually remove the connectorized fiber cables 105 parked at the parking adapters 111 that are not in use anymore, and patch them again in the original storage adapter 107. For example, when all parking adapters 111 are in use, an alarm is raised at the central office, which indicates that a service technician needs to manually remove the parked connectorized fiber cables 105.

Furthermore, it is possible to provide test access for testing the optical link ending on the patch panel 101 to the customer or to the central office. A dedicated test cable with a test connector (not shown) is physically connected to test equipment and may be integrated in the robotic unit or as integrated in a dedicated test unit. The test connector may be patched to every adapter 103, without interfering with the connectorized optical fiber cables 105 that are already installed in the system 100. Thus, an automated test routine may be initiated from the remote location, and the test connector may reach every individual adapter 103. The test connector may wear out, however the test connector is configured to be replaced with a new connector when needed. The replacement of the worn out test connector may be done automatically by the robotic unit, or manually by a service technician. The automated "test access sequence" does not require any manual intervention or truck roll.

Furthermore, the connectorized optical connectors of the optical fiber cables 105 and the adapters may be cleaned before use, by using an automated cleaning unit (not shown). In fact, when an adapter is cleaned, both the adapter sleeve and the optical connector sitting at opposite sides may be cleaned. The optical connectors and the adapters may be cleaned by using the same cleaning unit or by using a different cleaning unit. The cleaning unit may be a cleaning wipe, cleaning tape, cleaning pen etc. The cleaning unit may be manipulated by the robotic unit, and may, in some embodiments, be integrated in the robotic unit. In other embodiments, the cleaning unit may be a separate unit, separate from the robotic unit, dedicated to the task of cleaning optical connectors and adapters.

The optical fiber distribution system 100 is only dependent on power when the system 100 needs to be reconfigured or the robotic unit must perform an operation. Thus, there is no need for a backup power station connected to the optical fiber distribution system 100, i.e. provide a latching feature. When located in an outside cabinet, the optical fiber distribution system 100 may function with only for example battery power or solar power. Copper cables connected from a power station to the optical fiber distribution system 100 to provide power for operation of the system 100 may not be needed. The optical fiber distribution system 100 may comprise a nonvolatile memory which enables the system 100 to remember the state of all the adapters 103, parking adapters 111 and storage adapters 107 in case the power goes down. The nonvolatile memory is located locally at the system 100 and stored in a computer readable storage medium. The nonvolatile memory and database described above may be synchronized with the EMS that is running at the CO or NOC.

Figure 1C:
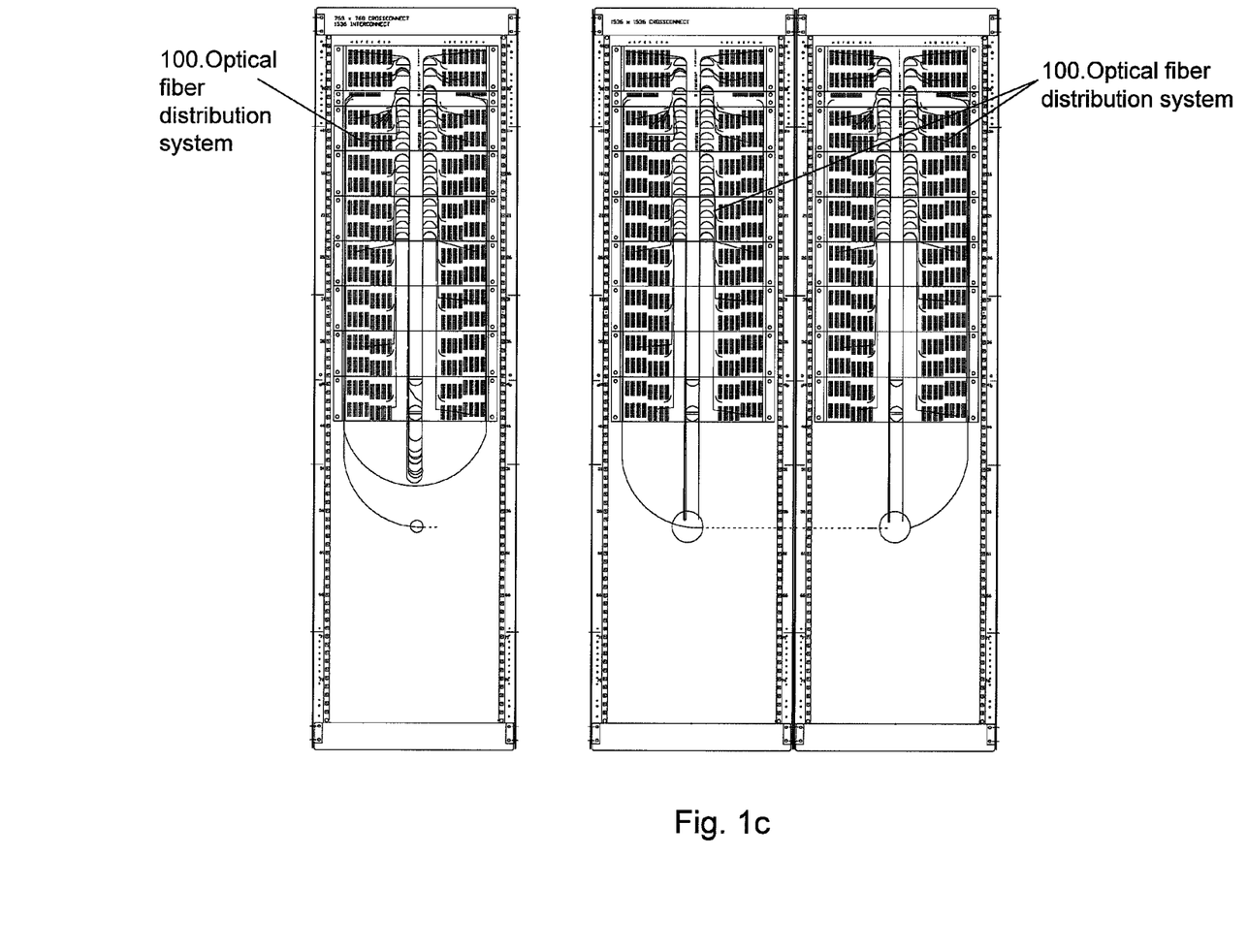
FIG. 1c is a diagram illustrating an embodiment of a semi-automated optical fiber distribution system with a plurality of patch panels.

As shown in FIGS. 1a and 1b, there are two patch panels 101 in the optical fiber distribution system 100, however this may be modified by adding further patch panels 101, as seen in FIG. 1c. Further, the number of adapters 103 may also be increased by adding additional adapters 103 on each patch panel 101. Similarly, the number of storage adapters 107 and parking adapters 111 may also be increased. This provides a scalable system 100 FIG. 1c shows patch panels 101 where the adapters arranged in a vertical manner, however the adapters may also be arranged in a horizontal manner, as illustrated in FIG. 1b.

The optical fiber distribution system 100 may be mounted inside a 19" frame or rack. Further, all fiber management is configured to take place inside the 19" frame. The 19" frame may have e.g. 192×192 crossconnect or 384 interconnect inside, or higher. In some embodiments, two or more 19" frames or racks may be located next to each other, each comprising an optical fiber distribution system 100, as illustrated in FIG. 1b. Optical fiber cables 105 may be connected between the two 19" frames or racks.

Figure 2:
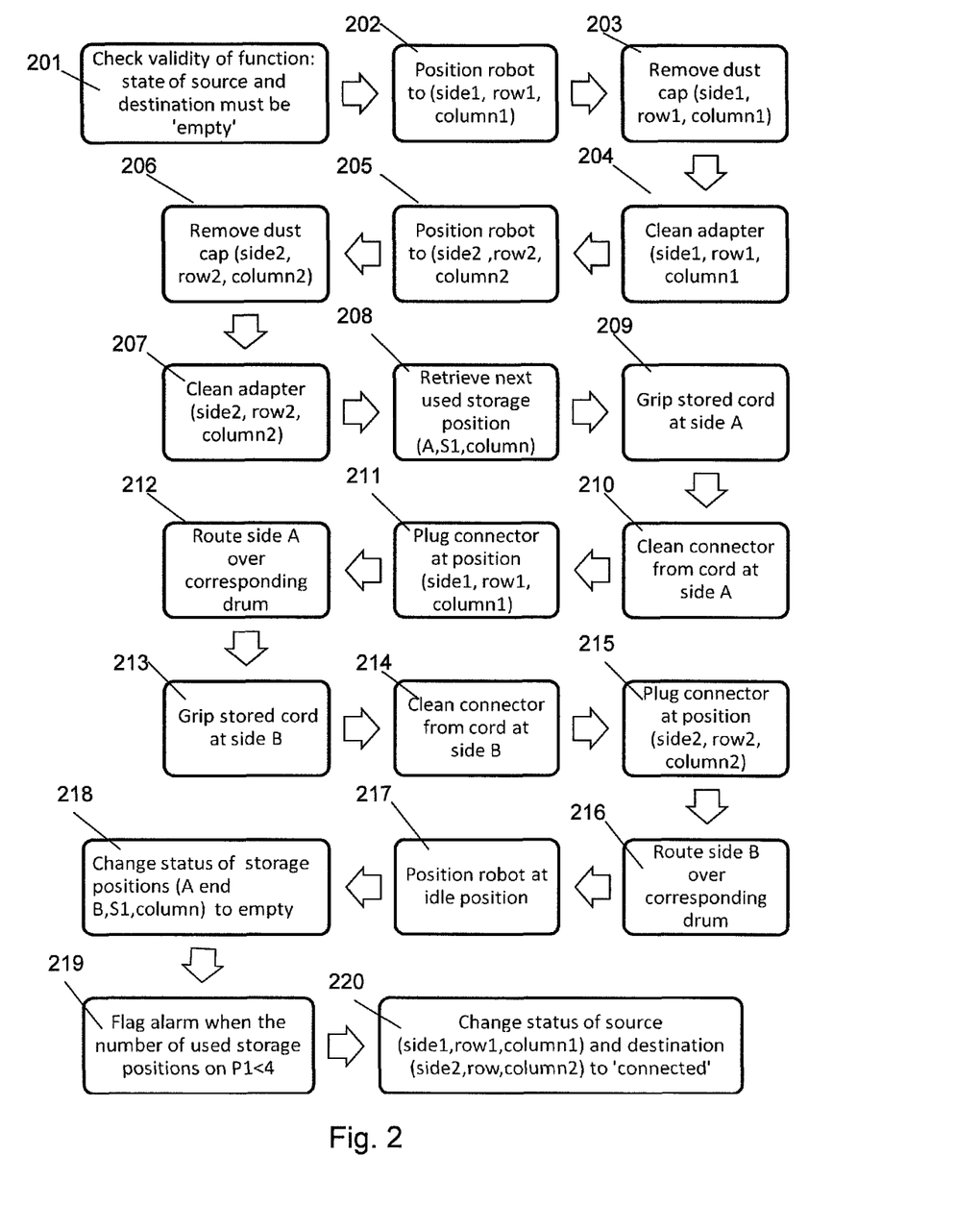
FIG. 2 is a flow chart illustrating connecting a connectorized fiber cable to a source and destination adapter, i.e. patchcord-crossconnect.

FIG. 2 is a flow chart illustrating an example method for connection of a connectorized fiber cable 105, such as a patch cord, from a source adapter 103 to a destination adapter 103. As mentioned earlier, the patch cord is a connectorized fiber cable 105 terminated in each end with an optical connector. This procedure is also called crossconnection. Before starting the first step, the connectorized fiber cable 105 is assumed to be stored in storage adapters 107. The source adapter 103 may be on side A and the destination adapter 103 may be on side B, or the source adapter 103 may be on side A and the destination adapter 103 may be on side A, or the source adapter 103 may be on side B and the destination adapter 103 may be on side B. When the source adapter 103 and the destination adapter 103 are at the same side, a crossing 118 in the steering unit 106 is made. The method comprises the following steps, which steps may be preformed in any suitable order:

Step 201
The robotic unit checks the validity of the function. This means that it checks that the state of the source adapter 103 and the destination adapter 103 is empty.

Step 202
The robotic unit is positioned in front of the source adapter 103.

Step 203
The robotic unit removes the dust cap of the source adapter 103. The robotic unit may drop the dust cap after removing it, and the service personnel may, when visiting the system for "clean up", handle the removed used dust caps.

Step 204
The robotic unit cleans the source adapter 103 by using the cleaning device as described above Step 205
The robotic unit is moved and positioned to the destination adapter 103. As mentioned above, the destination adapter 103 may be on the same side of the steering unit 106 as the source adapter 103, i.e. side A, or on opposite sides of the steering unit 106 in relation to the source adapter 103.

Step 206
The robotic unit removes the dust cap of the destination adapter 103.

Step 207
The robotic unit cleans the destination adapter 103 by using the cleaning device.

Step 208
The robotic unit retrieves information from the database of the next used storage position. This next used storage position is the position of the storage adapter 107 the robotic unit should go to, to get an optical connector.

Step 209
The robotic unit grips the stored connectorized fiber cable 105, e.g. patch cord, stored at side A by using a gripper.

Step 210
The robotic unit cleans the optical connector of the connectorized fiber cable 105, e.g. patch cord, by using the cleaning device.

Step 211
The robotic unit patches or plugs the optical connector to the source adapter 103.

Step 212
The robotic unit routes the connectorized fiber cable 105, e.g. patch cord, over the corresponding steering unit 106 on the same side as the source adapter 103, e.g. side A.

Step 213
The robotic unit grips the optical connector of the connectorized fiber cable 105, e.g. patch cord, stored at a storage adapter 107 on side B by using the gripper.

Step 214
The robotic unit cleans the optical connector of the connectorized fiber cable 105, e.g. patch cord, at side B.

Step 215
The robotic unit patches or plugs the optical connector to the destination adapter 103.

Step 216
The robotic unit routes the connectorized fiber cable 105 over the corresponding steering unit 106 on the same side as the destination adapter 103, e.g. side B.

Step 217
The EMS sends instructions to the robotic unit to be positioned in idle position.

Step 218
The robotic unit changes the status of the storage adapter 107 in the database to empty.

Step 219
The EMS flags an alarm when the number of used storage adapters 107 is less than for example four. This implies that all of the stored connectorized fiber cables 105 are in use, and there is a need for service personnel to manually add new connectorized fiber cables 105 to the system 100.

Step 220
The robotic unit changes the status of the source adapter 103 and the destination adapter 103 to "connected" in the database.

Figure 3:
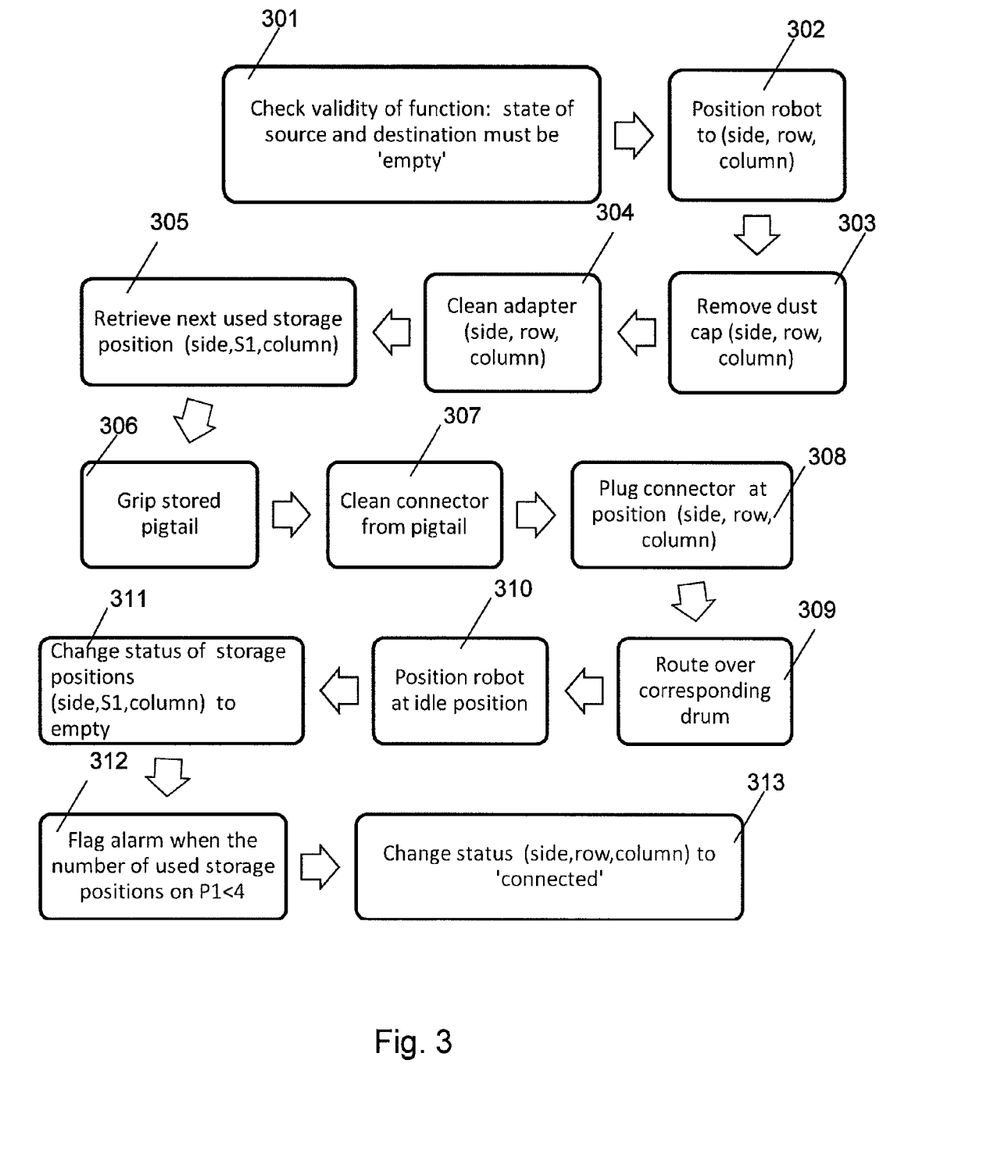
FIG. 3 is a flow chart illustrating connecting a connectorized fiber cable from a parking adapter to a destination adapter, i.e. pigtail-interconnect.

FIG. 3 is a flow chart illustrating an example method for connecting a stored optical connector of a connectorized fiber cable 105, such as a pigtail, to a destination adapter 103, where the optical connector is stored at the same side of the patch panel 101 as the destination adapter 103, e.g. side A in FIG. 1a or FIG. 1b. This procedure is also called interconnection. The method comprises the following steps, which steps may be preformed in any suitable order:

Step 301
The robotic unit checks the validity of the function. This means that it is checked that the state of the destination adapter 103 is "empty".

Step 302
The robotic unit is positioned in front of the destination adapter 103.

Step 303
The robotic unit removes the dust cap of the destination adapter 103.

Step 304
The robotic unit cleans the destination adapter 103 by using the cleaning device as described above.

Step 305
The robotic unit retrieves information from the database of the next used storage position. The next used storage position is the position for the storage adapter 107 that the robotic unit should go to, to get the optical fiber connector of an connectorized fiber cable 105, e.g. pigtail.

Step 306
The robotic unit grips the stored connectorized fiber cable 105, e.g. pigtail, by using a gripper.

Step 307
The robotic unit cleans the connector on the connectorized fiber cable 105, e.g. pigtail, by using the cleaning device.

Step 308
The robotic unit patches or plugs the optical connector to the destination adapter 103.

Step 309
The robotic unit routes the connectorized fiber cable 105 over the corresponding steering unit 106, e.g. drum.

Step 310
The EMS sends instructions to the robotic unit to go to idle position.

Step 311
The robotic unit changes the status of the storage adapter 107 position to empty in the database.

Step 312
The EMS may flag an alarm when the number of used storage positions is less than for example four.

Step 313
The robotic unit changes the status of the destination adapter 103 to "connected" in the database.

Figure 4:
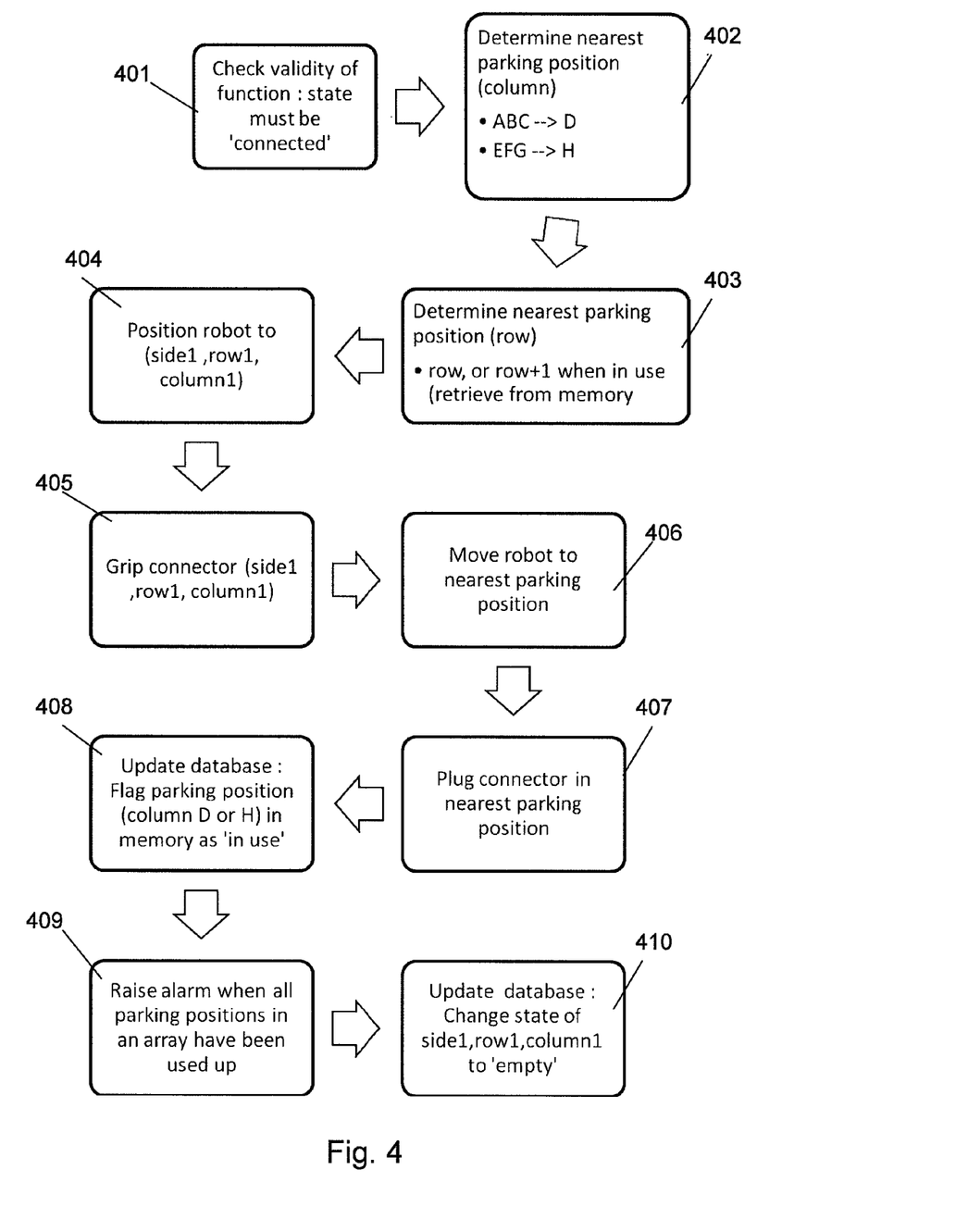
FIG. 4 is a flow chart illustrating disconnection of a connectorized fiber cable.

FIG. 4 is a flow chart illustrating an example method for disconnecting an optical connector, i.e. moving the optical connector from an adapter 103 to a parking adapter 111. Each respective subset of parking adapters 111 is positioned in a predetermined distance from the respective subset of adapters 103. As mentioned earlier, the predetermined distance may correspond to maximum a constant times the diameter of the connectorized fiber cable 105. The constant may preferably be in the range of 50-150, more preferably in the range of 75-125, and most preferably in the range of 90-110, and the diameter of the connectorized fiber cable 105 may preferably be in the range of 0.2 mm-10 mm, more preferably in the range 0.5 mm-5 mm and most preferably in the range of 0.8 mm-1.2 mm.

The method comprises the following steps, which steps may be preformed in any suitable order:

Step 401
The robotic unit checks the validity of the function. This means that it is checked that the state of the optical connector is "connected".

Step 402
The robotic unit determines the nearest column of parking adapters 111. In FIG. 1a, the nearest parking position for the adapter columns A, B and C is the parking adapter column D, and the nearest parking position for the adapter columns E, F and G is the parking adapter column H.

Step 403
The robotic unit determines the nearest row of parking adapters 111.

Step 404
The robotic unit is positioned in front of the optical connector.

Step 405
The robotic unit grips the optical connector by using a gripper.

Step 406
The robotic unit with the gripped optical connector moves to the determined nearest parking adapter 111.

Step 407
The robotic unit patches or plugs the optical connector to the determined nearest parking position where there is a parking adapter 111.

Step 408
The robotic unit updates the database by setting a flag on the determined parking adapter 111 indicating that it is "in use".

Step 409
The EMS raises an alarm when all parking adapters 111 in an array have been used up.

Step 410
The robotic unit updates the database by changing the state of the used adapter 103 to "empty".

Figure 5:
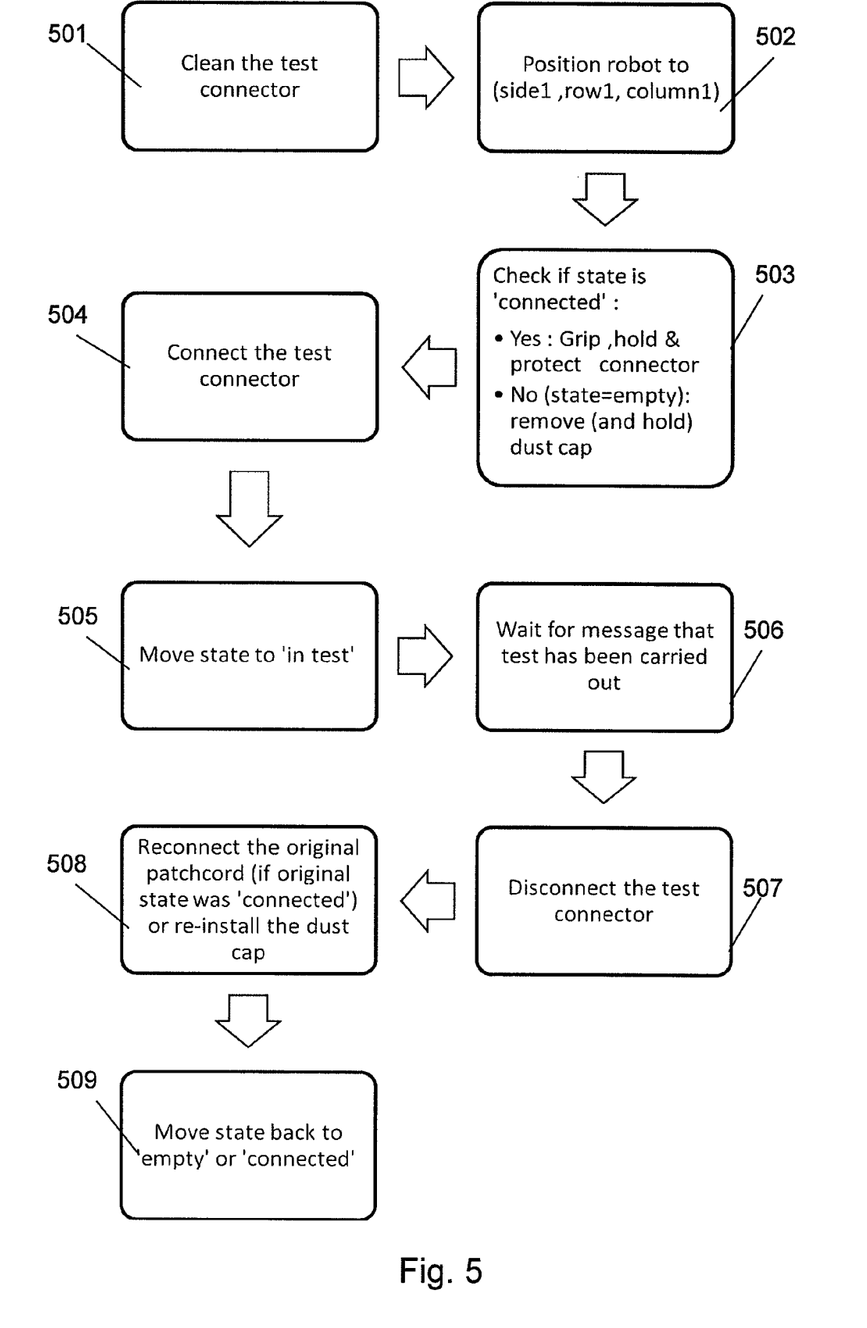
FIG. 5 is a flow chart illustrating test access.

FIG. 5 is a flow chart illustrating an example method for providing test access for testing the optical link ending on the patch panel 101 to the customer or to the central office. The optical fiber distribution system 100 comprises a test connector (not shown) dedicated for providing testing access. The test connector may be integrated with the robotic unit or as with a dedicated test unit. The example shown in FIG. 5 illustrates the case when the test connector is integrated with the robotic unit. The method comprises the following steps, which steps may be preformed in any suitable order:

Step 501
The robotic unit cleans the test connector by using the cleaning unit.

Step 502
The robotic unit positions itself to the adapter 103 where the optical connection is to be tested.

Step 503
The robotic unit checks the status of the adapter 103. It retrieves information from a database whether the state of the adapter 103 is "connected". If the state is "connected", the robotic unit grips, holds and protects the connector. If the state is not "connected", i.e. state=empty, the robotic unit removes and holds the dust cap.

Step 504
The robotic unit connects the test connector to the adapter 103.

Step 505
The robotic unit changes or moves the state of the adapter 103 in the database to "in test".

Step 506
The robotic unit waits for a message that the test has been carried out. The test is carried out by a test device located at the central office.

Step 507
The robotic unit disconnects the test connector

Step 508
If the original state of the adapter 103 was "connected", the robotic unit reconnects the original connectorized fiber cable 105, or re-installs the dust cap if the original state was empty.

Step 509
The robotic unit changes the state of the adapter 103 back to "empty" or "connected".

The method described above will now be described seen from the perspective of the optical fiber distribution system, in view of the FIGS. 2-5 illustrating examples of reconfiguration of the optical fiber distribution system 100. As mentioned earlier, the optical fiber distribution system 100 comprises at least one patch panel 101. The at least one patch panel 101 comprises a plurality of subsets of adapters 103. Each adapter 103 is configured to receive an optical connector and providing optical connection to the respective optical connector when patched in the respective adapter 103. The patch panel 101 further comprises a plurality of subsets of parking adapters 111. Each parking adapter 111 is configured to park an optical connector.

The system 100 further comprises at least a first connectorized fiber cable 105 terminated in a first end with a first optical connector. The first optical connector is connected to a first adapter 103. The at least one connectorized fiber cable 105 may be terminated in a second end with a second optical connector. The second optical connector may be connected to a second adapter 103.

The patch panel 101 may further comprise a plurality of subsets of storage adapters 107, each being configured to store an optical connector. At least a second connectorized fiber cable 105 may be terminated at a first end with a third optical connector patched to a first storage adapter 107. In some embodiments, the at least one second connectorized fiber cable 105 is terminated in a second end with a fourth optical connector. The fourth optical connector may be connected to a second storage adapter 107. In some embodiment, the adapters 103 are positioned so that a connectorized fiber cable 105 may be connected to any adapter 103 in one end and to any adapter 103 in the second end.

The method comprises the following steps, which steps may be preformed in any suitable order:

Step 601

In some embodiments a robotic unit is provided to the optical fiber distribution system 100 comprising a plurality of grippers each being configured to pick and place optical connectors from the adapters 103, parking adapters 111 and storage adapters 107 and configured to route the connectorized fiber cable 105 over the steering unit 106.

Step 602

In some embodiments, a dust cap is removed from the adapter 103.

Step 603

In some embodiments, an adapter 103 is cleaned before patching an optical connector to the adapter 103.

Step 604

In some embodiments, an optical connector is cleaned using the cleaning unit before patching the optical connector to the adapter 103.

Step 605

The first optical connector is moved from the first adapter 103 to a first parking adapter 111 in a first subset of the plurality of subset of parking adapters 111.

In some embodiments, each respective subset of parking adapters 111 is positioned in a predetermined distance from the respective subset of adapters 103.

The predetermined distance may correspond to maximum a constant times the diameter of the connectorized fiber cable 105.

The constant may preferably be in the range of 50-150, more preferably in the range of 75-125, and most preferably in the range of 90-110, and the diameter may preferably be in the range of 0.2 mm-10 mm, more preferably in the range 0.5 mm-5 mm and most preferably in the range of 0.8 mm-1.2 mm.

Step 606

In some embodiments, the connectorized optical cable 105 is routed over a steering unit 106.

Step 607

In some embodiments, the second optical connector of the connectorized fiber cable 105 is moved from the second adapter 103 to a second parking adapter 111 in a second subset of the plurality of subsets of parking adapters 111.

Step 608

In some embodiments, the connectorized optical cable 105 is routed over a steering unit 106.

Step 609

In some embodiments, an adapter 103 is cleaned before patching an optical connector to the adapter 103.

Step 610

In some embodiments, an optical connector is cleaned using the cleaning unit before patching the optical connector to the adapter 103.

Step 611

In some embodiments, the third optical connector is moved from the first storage adapter 107 to an adapter 103 in a first subset of the plurality of subset of adapters 103. The subset of storage adapters 107 is positioned so that a connectorized fiber cable 105 may be moved from the subset of storage adapters 107 to any of the subsets of adapters 103.

Step 612

In some embodiments, the connectorized optical cable 105 is routed over a steering unit 106.

Step 613

The fourth optical connector may be moved from the second storage adapter 107 to an adapter 103 in a second subset of the plurality of subsets of adapters 103.

Step 614

In some embodiments, the connectorized optical cable 105 is routed over a steering unit 106.

Step 615

In some embodiments, at least one third connectorized fiber cable 105 is added to the patch panel 105.

Step 616

In some embodiments, test access is provided for the optical connection provided by the adapters 103 to the optical connectors when patched in the respective adapter 103.

Even though FIG. 1*a* is used as an example when describing the methods above, a person skilled in the art will understand that the methods above are equally applicable to the horizontal layout of the optical fiber distribution system 100 illustrated in FIG. 1*b*.

Figure 6:
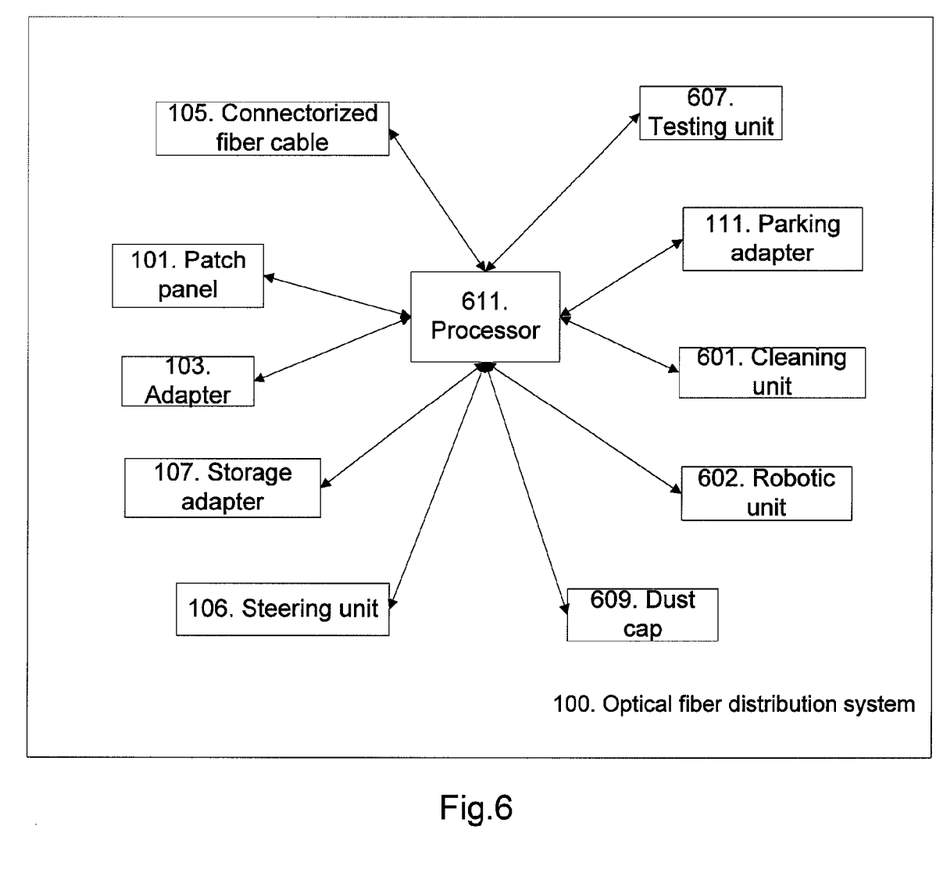
FIG. 6 is a block diagram illustrating embodiments of an optical fiber distribution system.

To perform the method steps described above for reconfiguration of an optical fiber distribution system 100. The optical fiber distribution system comprises an arrangement as shown in FIG. 6. As mentioned earlier, the optical fiber distribution system 100 comprises at least one patch panel 101 comprising a plurality of subsets of adapters 103. Each adapter 103 is configured to receive an optical connector and to provide optical connection to the respective optical connector when patched in the respective adapter 103. The system 100 further comprises at least one connectorized fiber cable 105 terminated in a first end with a first optical connector. The patch panel 101 further comprises a plurality of subsets of parking adapters 111. Each parking adapter 111 is configured to park a respective optical connector. Each of the respective subsets of parking adapters 111 corresponds to a respective subset of adapters 103, and each respective subsets of parking adapters 111 is positioned in a predetermined distance from the respective subset of adapters 103.

In some embodiments, the predetermined distance corresponds to maximum a constant times the diameter of the optical fiber cable 105.

In some embodiments, the constant is preferably in the range of 50-150, more preferably in the range of 75-125, and most preferably in the range of 90-110, and wherein the diameter is preferably in the range of 0.2 mm-10 mm, more preferably in the range 0.5 mm-5 mm and most preferably in the range of 0.8 mm-1.2 mm.

In some embodiments, the at least one connectorized fiber cable 105 is terminated in a second end with a second optical connector, In some embodiments, the patch panel 101 further comprises a plurality of subsets of storage adapters 107. Each storage adapter may be configured to store a respective optical connector before connection to an adapter 103. The subset of storage adapters 103 may be positioned so that an optical connector may be moved from the storage adapter 107 to any of the subsets of adapters 103 comprised in the patch panel 101.

In some embodiments, the optical fiber distribution system 100 further comprises a cleaning unit 601 configured to clean an adapter 103 before patching an optical connector to the adapter 103.

In some embodiments, the cleaning unit 601 is further configured to clean an optical connector before patching the optical connector to the adapter 103.

In some embodiments, the system 100 further comprises at least two patch panels 101.

In some embodiments, each respective connectorized fiber cable 105 is configured to be routed over a steering unit 106.

In some embodiments, the steering unit 106 is placed in the center of the optical fiber distribution system 100.

In some embodiments, the system further comprises a robotic unit 604 comprising a plurality of grippers each being configured to pick and place optical connectors from the adapters 103, parking adapters 111 and storage adapters 107 and to route the connectorized fiber cable 105 over the steering unit 106.

In some embodiments, the system 100 further comprises a testing unit 607 configured to provide test access for the optical connection provided by the adapters 103 to the optical connectors when patched in the respective adapter 103.

In some embodiments, the parking adapters 111 and storage adapters 107 provide non-optical connection for the respective connectorized fiber cable 105.

In some embodiments, the system 100 further comprises a dust cap 609 connected to each respective adapter 103.

In some embodiments, the adapters 103 are positioned so that a connectorized fiber cable 105 may be connected to any adapter 103 in one end and to any adapter 103 in the second end.

The present mechanism for reconfiguration of an optical fiber distribution system 100 may be implemented through one or more processors, such as a processor 611 in the arrangement depicted in FIG. 7, together with computer program code for performing the functions of the present solution. The processor 611 may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the present solution when being loaded into the optical fiber distribution system 100. One such carrier may be in the form of a CD ROM disc. It is however feasible with other data carriers such as a memory stick. The computer program code can furthermore be provided as pure program code on a server and downloaded to the optical fiber distribution system 100 remotely.

The present solution is not limited to the above described preferred embodiments. Various alternatives, modifications and equivalents may be used. Therefore, the above embodiments should not be taken as limiting the scope of the solution, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasized that the steps of the methods defined in the appended claims may, without departing from the present solution, be performed in another order than the order in which they appear in the claims.

The invention claimed is:

1. A method for reconfiguration of an optical fiber distribution system,
where, when an optical connection is to be established, the method comprises the step of:
moving an optical connector, said connector terminating an end of a connectorized fiber cable, from a storage adapter to a source/destination adapter, said source/destination adapter either being adapted to terminate an incoming optical fiber cable or being adapted to terminate an outgoing optical fiber cable and also being adapted to receive and provide optical connection to an optical connector, and said storage adapter being adapted to store an optical connector,
and where, when an optical connection is to be terminated, the method further comprises the step of:
moving an optical connector, said connector terminating an end of a connectorized fiber cable, from a source/destination adapter to a parking adapter, said parking adapter being adapted to park an optical connector,
where each storage adapter, parking adapter and source/destination adapter is positioned in at least one patch panel, and where the storage adapters are of a first type of adapters and the parking adapters are of another type of adapters, the method further comprising moving a third optical connector, from a first storage adapter in a plurality of subsets of storage adapters, to a source/destination adapter in a first subset of a plurality of subsets of source/destination adapters, said subsets of source/destination adapters and storage adapters being comprised in the at least one patch panel, the third optical connector being adapted to terminate a first end of a second connectorized fiber cable wherein the subset of storage adapters are positioned so that an optical connector can be moved from the storage adapter to any of the subsets of source/destination adapters, and
moving a first optical connector, connected to a source/destination adapter in the plurality of subsets of source/destination adapters, from the source/destination adapter to a first parking adapter in a first subset of a plurality of subset of parking adapters, said subsets of parking adapters being comprised in the at least one patch panel, the first optical connector being adapted to terminate a first end of a first connectorized fiber cable, where each respective subset of parking adapters is positioned at a predetermined distance from the respective subset of adapters.

2. The method according to claim 1, wherein the predetermined distance corresponds to maximum a constant times the diameter of the connectorized fiber cable.

3. The method according to claim 2, wherein the constant is in the range of 75-125 and the diameter is preferably in the range of 0.2 mm-10 mm.

4. The method according to claim 2, wherein the constant is in the range of 90-110 and the diameter is in the range of 0.8 mm-1.2 mm.

5. The method according to claim 1, wherein the at least one connectorized fiber cable is terminated in a second end with a second optical connector, the second optical connector being connected to a second source/destination adapter, and wherein the method further comprises:

moving the second optical connector of the connectorized fiber cable from the second source/destination adapter to a second parking adapter in a second subset of the plurality of subsets of parking adapters.

6. The method according to claim 1, wherein the at least one second connectorized fiber cable is terminated in a second end with a fourth optical connector, the fourth optical connector being connected to a second storage adapter, and wherein the method further comprises:

moving the fourth optical connector from the second storage adapter to a source/destination adapter in a second subset of the plurality of subsets of adapters.

7. The method according to claim 1, wherein the source/destination adapters are positioned so that a connectorized fiber cable can be connected between any of the source/destination adapters on said patch panel.

8. The method according to claims 1, wherein the method further comprises testing a source/destination adapter, the testing comprising the steps:

positioning a robotic unit to a source/destination adapter where the optical connections is to be tested;
    if the source/destination adapter is connected, removing the connector;
    connecting a test connector in the robotic unit to the source/destination adapter;
    carrying out test;
    disconnecting test connector; and
    if previously connected, reconnect connector.

9. An optical fiber distribution system which comprises at least one patch panel, wherein said at least one patch panel comprises at least one storage adapter, at least one source/destination adapter and at least one parking adapter, said source/destination adapter either being arranged to terminate an incoming optical fiber cable or being arranged to terminate an outgoing optical fiber cable and also being arranged to receive and provide optical connection to an optical connector, each storage adapter being arranged to store an optical connector before connection to a source/destination adapter, and each parking adapter being arranged to park an optical connector after connection to a source/destination adapter, each optical connector being arranged to terminate an end of a connectorized fiber cable, where the storage adapters are of a first type of adapters and the parking adapters are of another type of adapters, wherein the at least one patch panel further comprising a plurality of subsets of source/destination adapters, each source/destination adapter being configured to receive an optical connector and providing optical connection to the respective optical connector when patched in the respective source/destination adapter, the system further comprising at least one connectorized fiber cable terminated in a first end with a first optical connector, wherein the at least one patch panel further comprises a plurality of subsets of storage adapters, and wherein each subset of storage adapters is positioned so that an optical connector can be moved from any storage adapter to any of the subsets of source/destination adapters, and the at least one patch panel further comprising a plurality of subsets of parking adapters, where each of the respective subsets of parking adapters corresponds to a respective subset of source/destination adapters, where each respective subsets of parking adapters is positioned in a predetermined distance from the respective subset of source/destination adapters.

10. The optical fiber distribution system according to claim 9, wherein the predetermined distance corresponds to maximum a constant times the diameter of the optical fiber cable.

11. The optical fiber distribution system according to claim 9, wherein the at least one connectorized fiber cable is terminated in a second end with a second optical connector.

12. The optical fiber distribution system according to claim 9, wherein the optical fiber distribution system further comprises at least two patch panels, providing a scalable system where the adapters are arranged in a vertical manner or in a horizontal manner.

13. The optical fiber distribution system according to claim 9, further comprises a robotic unit comprising at least one gripper being configured to pick and place optical connectors to and from the source/destination adapters, to the parking adapters and from the storage adapters, and to route the connectorized fiber cable over a steering unit.

14. The optical fiber distribution system according to claim 13, wherein the robotic unit comprises a test connector, arranged to be connected to any source/destination adapter of said patch panel in order to test optical links of said patch panel.

15. The optical fiber distribution system according to claim 9, wherein the adapters are positioned such that a connectorized fiber cable can be connected between any of the adapters on said patch panel.

16. The optical fiber distribution system according to claim 10, wherein the constant is the range of 50-150 and the diameter is the range of 0.2 mm-10 mm.

17. The optical fiber distribution system according to claim 10, wherein the constant is in the range of 75-125 and the diameter is preferably in the range of 0.2 mm-10 mm.

18. The optical fiber distribution system according to claim 10, wherein the constant is in the range of 90-110 and the diameter is in the range of 0.8 mm-1.2 mm.

19. The method according to claim 2, wherein the constant is the range of 50-150 and the diameter is the range of 0.2 mm-10 mm.

* * * * *